(12) United States Patent
Valceanu et al.

(10) Patent No.: US 9,830,459 B2
(45) Date of Patent: *Nov. 28, 2017

(54) PRIVACY PROTECTION FOR MOBILE DEVICES

(71) Applicant: Bitdefender IPR Management Ltd., Nicosia (CY)

(72) Inventors: Vlad Valceanu, Bucharest (RO); Elena Burceanu, Bucharest (RO); Dragos T. Gavrilut, Iasi (RO); Tiberius Axinte, Iasi (RO); Vlad Bordianu, Iasi (RO); Razvan M. Benchea, Iasi (RO)

(73) Assignee: Bitdefender IPR Management Ltd., Nicosia (CY)

( * ) Notice: Subject to any disclaimer, the term of this patent is extended or adjusted under 35 U.S.C. 154(b) by 7 days.

This patent is subject to a terminal disclaimer.

(21) Appl. No.: 15/074,495

(22) Filed: Mar. 18, 2016

(65) Prior Publication Data

US 2016/0203320 A1   Jul. 14, 2016

Related U.S. Application Data

(63) Continuation of application No. 13/837,166, filed on Mar. 15, 2013, now Pat. No. 9,292,694.

(51) Int. Cl.
| | |
|---|---|
| *G06F 21/00* | (2013.01) |
| *G06F 21/57* | (2013.01) |
| *H04W 12/10* | (2009.01) |
| *H04W 12/02* | (2009.01) |
| *G06F 21/51* | (2013.01) |
| *H04W 12/12* | (2009.01) |

(52) U.S. Cl.
CPC ............ *G06F 21/577* (2013.01); *G06F 21/51* (2013.01); *G06F 21/57* (2013.01); *H04W 12/02* (2013.01); *H04W 12/10* (2013.01); *G06F 2221/033* (2013.01); *H04W 12/12* (2013.01)

(58) Field of Classification Search
None
See application file for complete search history.

(56) References Cited

U.S. PATENT DOCUMENTS

2008/0086660 A1* 4/2008 Wefers ................ G06F 11/3688 714/37
2011/0047620 A1* 2/2011 Mahaffey .............. G06F 21/564 726/23

(Continued)

*Primary Examiner* — Hadi Armouche
*Assistant Examiner* — Andrew Steinle
(74) *Attorney, Agent, or Firm* — Law Office of Andrei D Popovici, PC

(57) ABSTRACT

Described systems and methods allow a mobile device, such as a smartphone or a tablet computer, to protect a user of the respective device from fraud and/or loss of privacy. In some embodiments, the mobile device receives from a server a risk indicator indicative of whether executing a target application causes a privacy risk. Determining the risk indicator includes automatically supplying a test input to a data field used by the target application, the data field configured to hold a private item such as a password or a geolocation indicator. Determining the risk indicator further comprises determining whether a test device executing an instance of the target application transmits an indicator of the test input, such as the test input itself or a hash of the test input, to another party on the network.

24 Claims, 9 Drawing Sheets

(56) References Cited

U.S. PATENT DOCUMENTS

2012/0110674 A1* 5/2012 Belani .................. H04W 4/001
            726/25
2013/0227683 A1* 8/2013 Bettini .................. G06F 21/57
            726/22

* cited by examiner

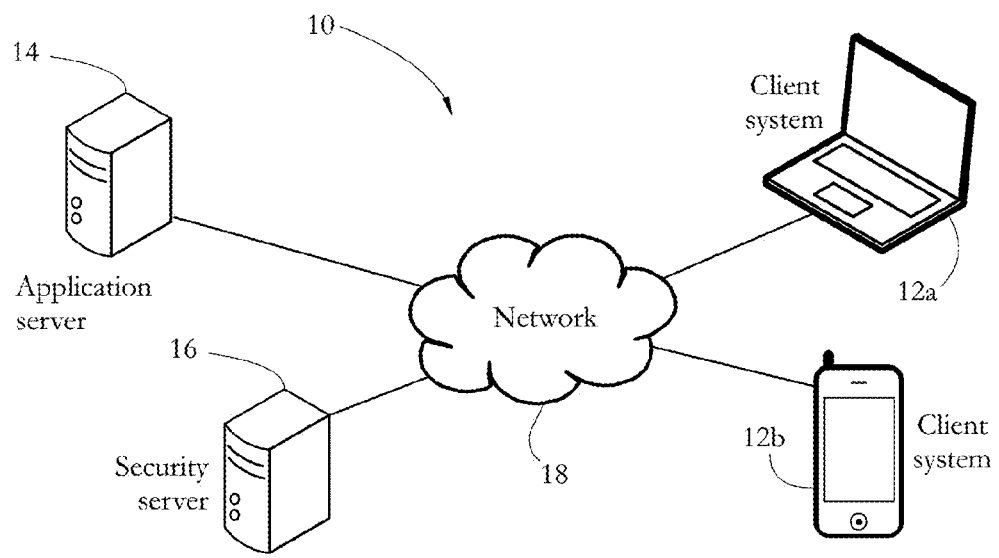
FIG. 1
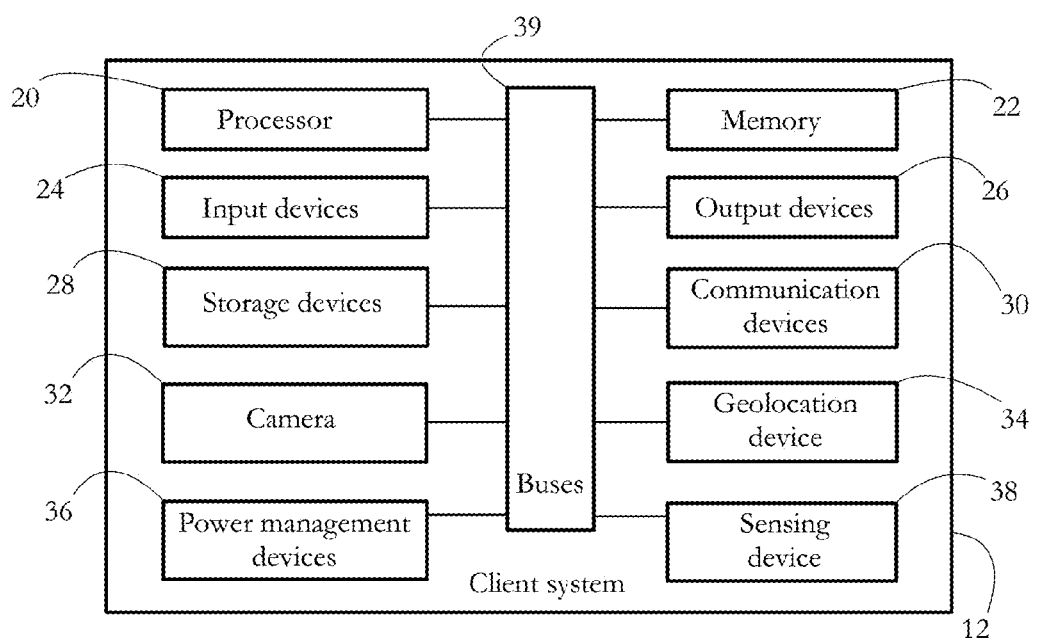
FIG. 2-A

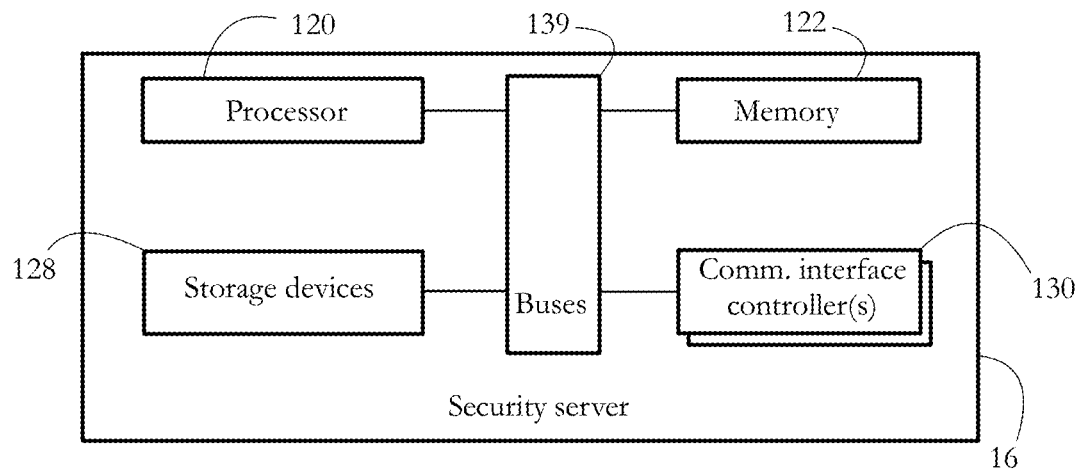
FIG. 2-B
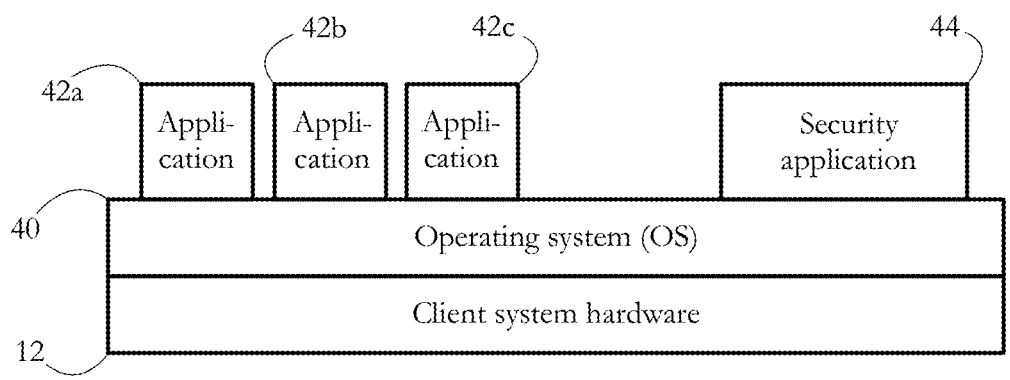
FIG. 3

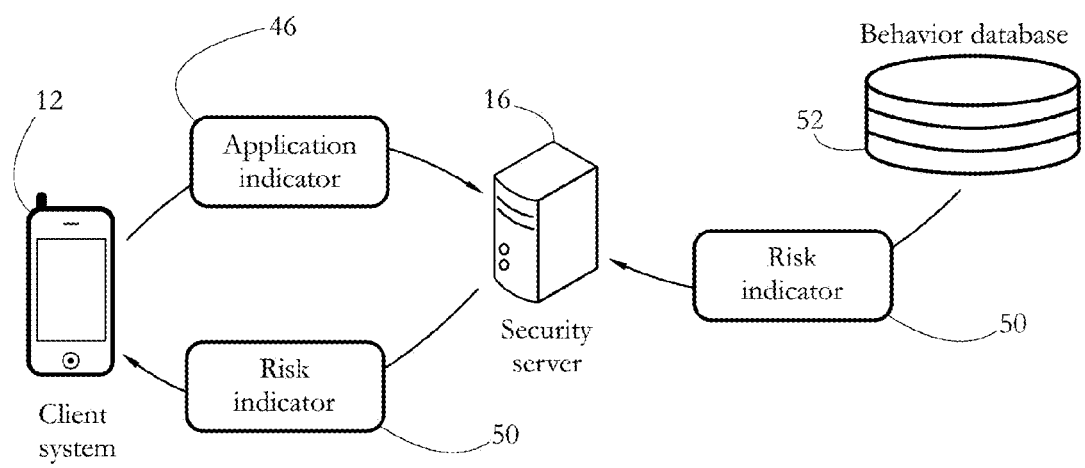
FIG. 4-A
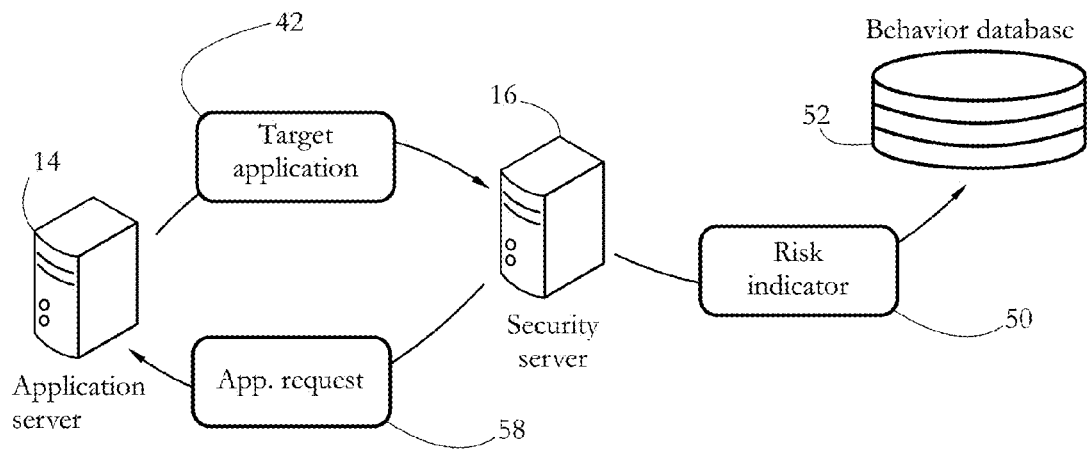
FIG. 4-B

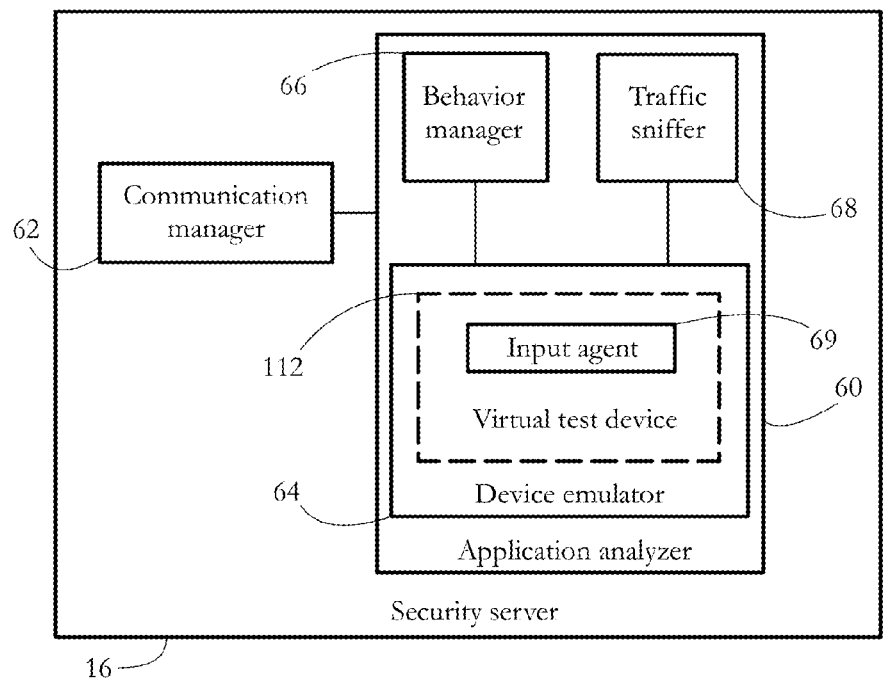
FIG. 7-A
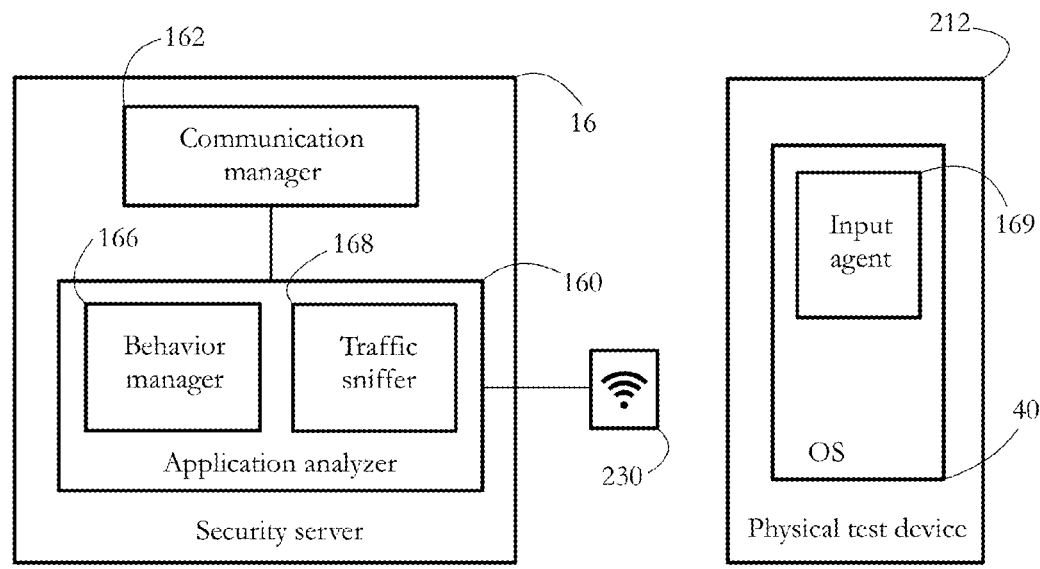
FIG. 7-B

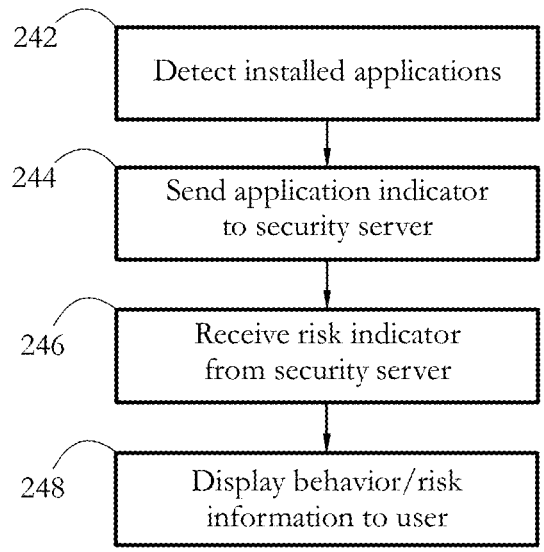
FIG. 11-A
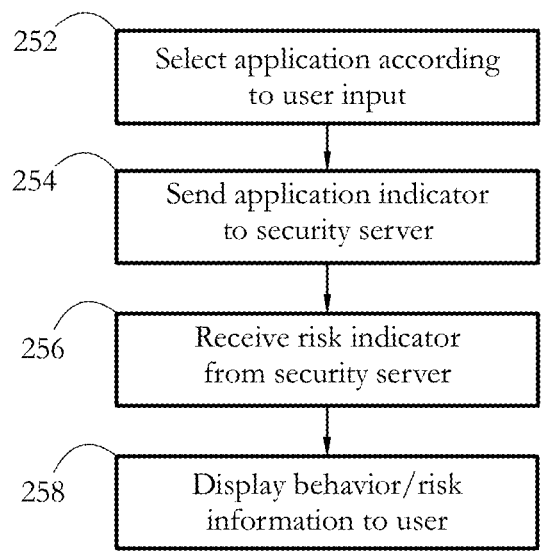
FIG. 11-B

PRIVACY PROTECTION FOR MOBILE DEVICES

RELATED APPLICATION DATA

This application is a continuation of U.S. patent application Ser. No. 13/837,166 by Valceanu et al., titled "Privacy Protection for Mobile Devices", filed on Mar. 15, 2013, which is herein incorporated by reference.

BACKGROUND

The invention relates to systems and methods for protecting computer and mobile communication systems from malware, and in particular to protecting users of such devices from privacy-invading and/or fraudulent use of personal data.

Modern mobile computing and telecommunication devices, such as smartphones, tablet computers, and wearable computing devices, are capable of executing a variety of application programs, commonly known as apps. Such applications are developed by thousands of developers worldwide, and may be downloaded from specialized online aggregators such as APPLE, Inc.'s APP STORE®, or GOOGLE's GOOGLE PLAY®. Applications may use components, features, and functionalities of the respective mobile device, such as a camera or a geolocation feature of the device. For instance, an application may determine a current geographical position of the device and display to a user a list of restaurants located in the vicinity of the current position.

Some applications may access personal information of the users, such as a user's name, street address, telephone number, email address, or contact list, among others. Other examples of data accessed by apps include identification data and a network address of the respective mobile device. Some applications may further modify, record, and/or transmit such information to other parties over local or wide-area networks, including the Internet. In some cases, such operations are performed without knowledge or permission of the respective user, thus exposing the user to a risk of privacy invasion and, in worst cases, fraud. Often, users are unaware of such risks.

SUMMARY

According to one aspect, a computer system comprises at least one hardware processor configured to determine a risk indicator indicative of whether executing a target application on a mobile computing device causes a privacy risk to a user of the mobile computing device. Determining the risk indicator comprises supplying a test input to an instance of the target application executing on a test device, the test input supplied to a data field configured to hold an indicator of a private item, wherein a disclosure of the private item causes the privacy risk. Determining the risk indicator further comprises, in response to supplying the test input, determining whether executing the instance of the target application would cause the test device to transmit a data item to a network, the data item selected from a group consisting of the test input and of a hash determined according to the test input. Determining the risk indicator further comprises, in response, when executing the instance of the target application would cause the test device to transmit the indicator of the test input to the network, determining that executing the target application causes the privacy risk.

According to another aspect, a mobile device comprises at least one hardware processor configured to perform risk assessment transactions with a security server, wherein a risk assessment transaction comprises employing the at least one hardware processor to send an indicator of a target application to the security server, and in response to sending the indicator of the target application, employing the at least one hardware processor to receive from the security server a risk indicator determined for the target application, the risk indicator indicative of whether executing the target application causes a privacy risk. Determining the risk indicator comprises supplying a test input to an instance of the target application executing on a test device, the test input supplied to a data field configured to hold an indicator of a private item, wherein a disclosure of the private item causes the privacy risk. Determining the risk indicator further comprises, in response to supplying the test input, determining whether executing the instance of the target application would cause the test device to transmit a data item to a network, the data item selected from a group consisting of the test input and of a hash determined according to the test input. Determining the risk indicator further comprises, in response, when executing the instance of the target application would cause the test device to transmit the indicator of the test input to the network, determining that executing the target application causes the privacy risk.

According to another aspect, a method comprises employing at least one hardware processor of a computer system to determine a risk indicator indicative of whether executing a target application on a mobile computing device causes a privacy risk to a user of the mobile computing device. Determining the risk indicator comprises supplying a test input to an instance of the target application executing on a test device, the test input supplied to a data field configured to hold an indicator of a private item, wherein a disclosure of the private item causes the privacy risk. Determining the risk indicator further comprises, in response to supplying the test input, determining whether executing the instance of the target application would cause the test device to transmit a data item to a network, the data item selected from a group consisting of the test input and of a hash determined according to the test input. Determining the risk indicator further comprises, in response, when executing the instance of the target application would cause the test device to transmit the indicator of the test input to the network, determining that executing the target application causes the privacy risk.

According to another aspect, a non-transitory computer-readable medium stores instructions which, when executed by at least one hardware processor of a computer system, cause the computer system to determine a risk indicator indicative of whether executing a target application on a mobile computing device causes a privacy risk to a user of the mobile computing device. Determining the risk indicator comprises supplying a test input to an instance of the target application executing on a test device, the test input supplied to a data field configured to hold an indicator of a private item, wherein a disclosure of the private item causes the privacy risk. Determining the risk indicator further comprises, in response to supplying the test input, determining whether executing the instance of the target application would cause the test device to transmit a data item to a network, the data item selected from a group consisting of the test input and of a hash determined according to the test input. Determining the risk indicator further comprises, in response, when executing the instance of the target application would cause the test device to transmit the indicator of the test input to the network, determining that executing the target application causes the privacy risk.

BRIEF DESCRIPTION OF THE DRAWINGS

The foregoing aspects and advantages of the present invention will become better understood upon reading the following detailed description and upon reference to the drawings where:

FIG. 1 shows an exemplary privacy protection system protecting a plurality of client systems according to some embodiments of the present invention.

FIG. 2-A shows an exemplary hardware configuration of a client system according to some embodiments of the present invention.

FIG. 2-B shows an exemplary hardware configuration of a security server according to some embodiments of the present invention.

FIG. 3 illustrates an exemplary software stack executing on a client system according to some embodiments of the present invention.

FIG. 4-A shows an exemplary risk assessment transaction between a client system and the security server according to some embodiments of the present invention.

FIG. 4-B shows an exemplary transaction between the security server and the application server, the transaction performed to determine, according to some embodiments of the present invention, whether executing a target application creates a privacy risk.

FIG. 7-A shows exemplary components executing on the security server according to some embodiments of the present invention.

FIG. 7-B shows an configuration of the security server, wherein a test device is used in conjunction with software components executing on the security server, according to some embodiments of the present invention.

FIG. 11-A shows an exemplary sequence of steps performed by a security application executing on a client system according to some embodiments of the present invention.

FIG. 11-B shows another exemplary sequence of steps performed by a security application executing on a client system according to some embodiments of the present invention.

DETAILED DESCRIPTION OF PREFERRED EMBODIMENTS

Figure 5:
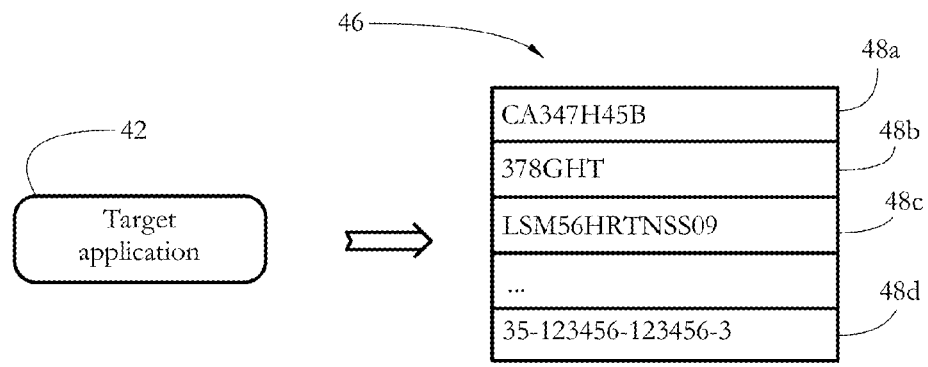
FIG. 5 shows an exemplary application indicator sent by the client system of FIG. 4-A, according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a hash is an output of a hash function. Unless otherwise specified, a hash function is a one-way mathematical transformation mapping a sequence of symbols (e.g. characters, bits) into a number or bit string. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

FIG. 1 shows an exemplary privacy protection system 10 according to some embodiments of the present invention. System 10 comprises a plurality of client systems 12a-b, an application server 14, and a security server 16, all connected by a communication network 18. Network 18 may be a wide-area network such as the Internet, while parts of network 18 may also include a local area network (LAN). Security server 16 may be embodied as a single physical machine, or as a plurality of physical machines interconnected by parts of network 18.

Client systems 12a-b include mobile devices, such as smartphones, tablet computers, wearable computing devices (e.g smart glasses, smart watches, etc.), and media players, among others. Other exemplary client systems include personal computers and laptops, personal digital assistants (PDA), and other devices such as TVs, refrigerators, and digital cameras, among others. In some embodiments, each client system 12a-b comprises a processor, memory, and means to connect to network 18. Client systems 12a-b may represent individual users/customers, or several client systems may belong to the same user/customer. In some embodiments, each client system 12a-b is configured to execute a set of software applications, for instance, to access electronic documents over network 18, to maintain address books of contacts, to display maps or navigation information, to play games, to take photographs, or to play music, among others.

In some embodiments, application server 14 is configured to distribute applications to client systems 12a-b and/or security server 16. Exemplary application servers 14 include servers hosting the APP STORE® service provided by APPLE, Inc., and servers hosting the GOOGLE PLAY® service from GOOGLE, Inc. In an exemplary embodiment, client systems 12a-b may connect to application server 14, and may selectively retrieve an application for installation and execution on the respective client system. Application server 14 may present users with a list of available applications, and may allow users to select for download and/or to configure such applications.

In some embodiments, security server 16 is configured to identify a set of risk-indicative behaviors of a set of applications, e.g., applications available for download from application server 14. Security server 16 may be further configured to perform risk assessment transactions with client systems 12a-b, to indicate to each client system whether installing and/or executing an application exposes a user of the respective client system to a privacy risk, as shown in detail below. In some embodiments, privacy risk comprises a risk of losing personal information, such as an address, a telephone number, a social security number, an address book entry, and a geographical location, among others. Privacy risk may further comprise a risk of losing financial information and/or authentication information; such privacy risk may comprise a risk of fraud. In some embodiments, authentication information allows a user to authenticate himself or herself with a service; such authentication information may comprise an authentication name (e.g., username, customer number, bank account number, alias, avatar, social network ID, etc.), a password, an access code, a PIN number, and a cryptographic key, among others.

In some embodiments, identifying risk-indicative behaviors of an application comprises determining whether the respective application performs a pre-determined set of risk-indicative behaviors. Said set of behaviors may be assembled, for instance by human operators, prior to server 16 performing risk assessment, and may include risk-indicative behaviors such as accessing a user's address book, sending sensitive items (e.g., a name, an address book entry, a username, a password, an indicator of a geographical position of the respective client system, a device identifier, etc.) to another party over network 18, and accessing a camera or a microphone of the respective client system, among others. Other examples of risk-indicative behaviors of an application are listed below.

Uses an anonymous identifier
Background audio services
Can display ads
Background Voice-Over-Internet-Protocol
Tracks web usage (analytic tools from MEDIALETS, Inc.)
Tracks web usage (OPEN FEINT®)
Tracks web usage (FLURRY® analytics from YAHOO, Inc.)
Tracks web usage (analytic tools from MOBCLIX, Inc.)
Tracks web usage (GOOGLE ANALYTICS®)
Connects to FACEBOOK®
Connects to TWITTER®
Encrypts stored data
Can change a user's Calendar
Sends unencrypted password
Sends unencrypted username
Reads a user's Address Book
Tracks a user's/device's location
Sends a user's/device's Location
Background location tracking
Sends names from Address Book to other entities
Sends numbers from Address Book to other entities
Sends email addresses from Address Book to other entities
Uses a device's identification indicator (e.g., UDID)
Sends a device's identification indicator
Can read a user's Calendar FIG. 2-A shows an exemplary hardware configuration of a client system 12, such as systems 12a-b of FIG. 1. FIG. 2-A shows a mobile device for illustrative purposes; the hardware configuration of other devices, such as personal computers, may differ. In some embodiments, client system 12 comprises a processor 20, a memory unit 22, a set of input devices 24, a set of output devices 26, a set of storage devices 28, and a set of communication devices 30, all connected to a set of buses 39. Client system 12 may further include a camera 32, a geolocation device 34, a power management device 36, and a sensing device 38, connected to buses 39. In some embodiments, such as system-on-a-chip configurations, some of devices 20-39 may be integrated into a common hardware device, for instance, an integrated circuit.

In some embodiments, processor 20 comprises a physical device (e.g. multi-core integrated circuit) configured to execute computational and/or logical operations with a set of signals and/or data. In some embodiments, such logical operations are delivered to processor 20 in the form of a sequence of processor instructions (e.g. machine code or other type of software). Memory unit 22 may comprise volatile computer-readable media (e.g. RAM) storing data/signals accessed or generated by processor 20 in the course of carrying out instructions. Input devices 24 may include computer touchpads, keyboards, mice, and microphones, among others, including the respective hardware interfaces and/or adapters allowing a user to introduce data and/or instructions into system 12. Output devices 26 may include display devices such as telephone screens, monitors, and speakers, among others, as well as hardware interfaces/adapters such as graphic cards, allowing system 12 to communicate data to a user. In some embodiments, input devices 24 and output devices 26 may share a common piece of hardware, as in the case of touch-screen devices. Storage devices 28 include computer-readable media enabling the non-volatile storage, reading, and writing of software instructions and/or data. Exemplary storage devices 28 include flash memory devices and magnetic and optical disks, as well as removable media such as CD and/or DVD disks and drives. Communication devices 30 enable system 12 to connect to network 18 and/or to other devices/computer systems. In some embodiments, communication devices 30 enable system 12 to connect to network 18 via a plurality of carrier media and protocols. For instance, devices 30 may include Ethernet adapters, wireless modems, BLUETOOTH® modems, and Global Positioning System (GPS) receivers, among others. Camera 32 may comprise hardware configured to collect and/or process images. Geolocation device 34 may include hardware enabling receiving and processing satellite signals to produce a set of data indicative of a geographical location of client system 12. Power management devices 36 may include batteries and hardware configured to supervise battery charging and power consumption by various devices of client system 12. Examples of sensing devices 38 include a temperature sensor, a light sensor, a gyroscope, and an accelerometer, among others. Buses 39 collectively represent the plurality of system, peripheral, and chipset buses, and/or all other circuitry enabling the inter-communication of devices 20-38 of client system 12. In an example wherein client system 12 is a computer, buses 39 may comprise the northbridge connecting processor 20 to memory 22, and/or the southbridge connecting processor 20 to devices 24-38, among others.

FIG. 2-B shows an exemplary hardware configuration of security server 16 according to some embodiments of the present invention. Security server 16 includes a processor 120 and a memory unit 122, and may further comprise a set of storage devices 128 and at least one communication interface controller 130, all connected by a set of buses 139. In some embodiments, the operation of processor 120, memory 122, and storage devices 128 may be similar to the operation of items 20, 22, and 28, respectively, as described above in relation to FIG. 2-A. Memory unit 122 stores data/signals accessed or generated by processor 120 in the course of carrying out instructions. Controller(s) 130 enable(s) security server 16 to connect to network 18, to transmit and/or receive data to/from other systems connected to network 18. Exemplary controller(s) 130 include network adapters, among others.

FIG. 3 illustrates an exemplary software stack executing on client system 12 according to some embodiments of the present invention. In some embodiments, system 12 executes an operating system (OS) 40 and/or a set of software applications 42a-c. OS 40 comprises software that provides an interface to the hardware of client system 12, and acts as a host for computing applications 42a-c running on the respective OS. OS 40 may comprise any widely available operating system such as IOS®, ANDROID®, WINDOWS®, MACOS®, or LINUX®, among others. Applications 42a-c may include browser, calendar, word processing, image processing, database, productivity, electronic communication (e.g., email, instant messaging), entertainment (e.g., media player, gaming), social media (e.g., FACEBOOK®), mapping/navigation, online banking, and online shopping applications, among others.

In some embodiments, a security application 44 executes on OS 40, security application 44 configured to receive from security server 16 an indicator of a behavior of software applications 42a-c, as detailed below. In particular, the respective behavior may be indicative of a privacy risk to which a user of client system 12 is exposed by installing the respective applications, and/or by executing the respective applications. Security application 44 may be further configured to display information about such risks and/or risk-indicative behaviors to a user of client system 12. For instance, application 44 may assemble a list of all applications 42a-c installed on client system 12, and for each such application, display a list of risk-indicative behaviors associated to the respective application. The operation of security application 44 will be discussed in more detail below.

FIG. 4-A shows an exemplary risk assessment transaction between client system 12 and security server 16. In some embodiments, client system 12, for instance via security application 44, may send an application indicator 46 to security server 16. In response to receiving indicator 46, security server 16 may identify a target application according to indicator 46, and may selectively retrieve a risk indicator 50 indicative of a behavior performed by the respective target application from a behavior database 52. Security server 16 may further transmit risk indicator 50 to client system 12, thus concluding the risk-assessment transaction.

Parts of database 52 may reside on security server 16, on a separate physical machine, and/or on computer-readable media connected to security server 16 by way of e.g., network 18. In some embodiments, behavior database 52 comprises a set of behavior entries, and a set of application entries, wherein each behavior entry is indicative of an application behavior, such as accessing a user's address book, and wherein each application entry is indicative of an application. In some embodiments, behavior database 52 may further comprise an indicator, such as a hash index, indicative of an association between a behavior and an application performing the respective behavior. Such an association indicator may enable security server 16 and/or client systems 12a-b to selectively retrieve a behavior entry according to application indicator 46. In some embodiments, an application may be associated with a plurality of behaviors, and/or a behavior may be associated with a plurality of applications.

Some behavior entries may represent risk-indicative behaviors, i.e., behaviors associated with a privacy risk; for each such entry, database 52 may store a flag indicating that the respective behavior poses a risk. Each behavior entry of a risk-indicative behavior may comprise a description of the respective behavior, indicating, for instance, why the respective behavior is risky, and/or giving an exemplary scenario exemplifying the risk to the user. The respective behavior entry may further comprise an indicator of a type of risk (e.g., fraud) and/or level of risk (e.g., low, medium, and high). In some embodiments, a behavior entry may further comprise an indicator of an operating system and/or of an operating system version, wherein the respective behavior is observed. For instance, there may exist behaviors, which can only be performed, or have only been observed, on Android® platforms. In some embodiment, behavior entries are pre-determined and input into database 52 e.g. by human operators.

Each application entry of database 52 may include an indicator of a name and version of the respective application. In some embodiments, each application entry may further comprise elements of application indicator 46 (e.g, hashes, see below) determined for the respective application, and allowing a positive identification of the respective application.

In some embodiments, security server 16 is configured to populate database 52 by identifying a set of risk-indicative behaviors associated with a set of applications distributed by application server 14. Identifying such risk-indicative behaviors may comprise determining whether each application performs a selected behavior identified by a behavior entry stored in database 52. When the respective application performs the selected behavior, the operation of security server 16 further comprises updating database 52 to include an application entry of the respective application, and/or updating database 52 to indicate an association between the behavior entry of the respective behavior and the application entry of the respective application. FIG. 4-B shows an exemplary transaction between security server 16 and application server 14, the transaction performed to identify risk-indicative behaviors of a target application 42. In some embodiments, security server 16 transmits an application request 58 to application server 14, request 58 comprising a request to retrieve a copy of target application 42 from server 14. In response, application server 14 may send the copy of target application 42 to security server 16. Server 16 may the determine risk indicator 50 indicating a behavior of target application 42, and transmit indicator 50 to database 52. The operation of security server 16 is further detailed below.

FIG. 5 shows an exemplary application indicator 46 determined for target application 42, such as applications 42a-c in FIG. 3. In some embodiments, indicator 46 comprises data enabling security server 16 to selectively identify target application 42 from a plurality of applications. Such identification may comprise determining a name and a version (e.g., release number, build number, update timestamp) of the target application, and may further comprise determining a name and version of the operating system executing on the client system hosting the respective application. An exemplary identification may be: target application is Path® from Path, Inc., version 2.9.4, executing on Android® 4.0. In some embodiments, indicator 46 may not allow security server 16 to unequivocally identify the target application, as there may be a plurality of target applications indicated to by the respective instance of indicator 46. In one such example, several distinct applications may employ the same application programming interface (API) during execution. Attempting to identify a target application according to whether it uses the respective API, may therefore produce multiple matching applications. In an additional example, two processes, each launched by a distinct application, may have the same name. Identifying the respective applications according to the process name may therefore fail to produce unequivocal identification. Some embodiments of indicator 46 may enable the determination of the application name, but not of the application version or operating system.

In some embodiments, application indicator 46 includes a set of values (e.g., alphanumeric) determined according to target application 42. Such values may include a set of hashes, illustrated as items 48*a*-*c* in FIG. 5. An exemplary indicator 46 includes a hash of a name of a package file of the respective application, for instance a hash of the name of the respective APP file on iOS® platforms, or a hash of the name of the respective APK file on client systems running Android®. Another exemplary indicator includes a hash of an image file used as a screen icon by the respective target application. In some embodiments, indicator 46 comprises an indicator (e.g., hash of a name) of a process launched by target application 42. Indicator 46 may further include an indicator of a Uniform Resource Identifier (URI) scheme used by target application 42. Examples of such URI schemes include http:, facebook:, facetime:, mailto:, skype:, and market:, among others. Other exemplary indicators 46 include platform-dependent application identifiers such as indicators of a path or of a location/address where data of the respective application is stored. Indicator 46 may further include an identifier of the hardware of client system 12, such as an International Mobile Station Equipment Identity (IMEI) number, illustrated as item 48*d* in FIG. 5, or a Unique Device Identifier (UDID), among others.

Figure 6:
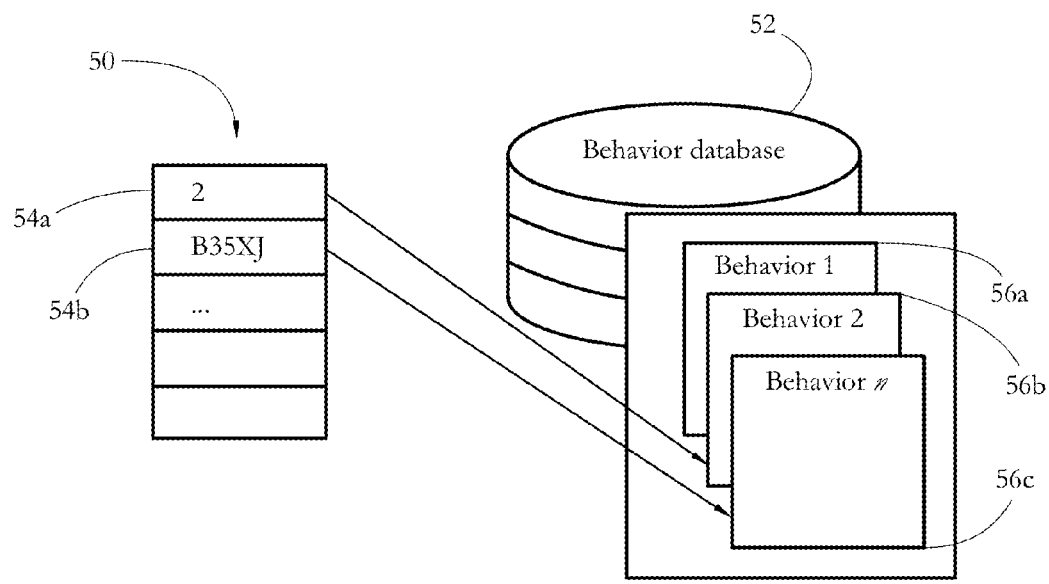
FIG. 6 illustrates an exemplary risk indicator received by the client system of FIG. 4-A, according to some embodiments of the present invention.

FIG. 6 shows an exemplary risk indicator 50 received by client system 12 from security server 16 in response to sending application indicator 46. Risk indicator 50 comprises a set of values, for instance alphanumeric, each value indicative of a behavior of target application 42. An exemplary risk indicator includes a behavior label (pointer), illustrated as item 54*a*, and/or a behavior hash index, illustrated as item 54*b*. Such pointers/hash indices establish a correspondence between target application 42 and a selected set of behavior entries 56*a*-*c* stored in behavior database 52, hence indicating a set of behaviors associated with target application 42. For instance, in the example of FIG. 6, item 54*a* points to a behavior entry 56*b*, whereas item 54*b* points to a behavior entry 56*c*.

FIG. 7-A shows exemplary components executing on security server 16 according to some embodiments of the present invention. Server 16 may include a communication manager 62 and an application analyzer 60 connected to communication manager 62. Application analyzer 62 may further comprise a behavior manager 66 and a traffic sniffer 68, both connected to a device emulator 64. In some embodiments, communication manager 62 is configured to perform transactions with client systems 12*a*-*b* and/or application server 14, as illustrated in FIGS. 4-A-B. Such transactions may include establishing connections over network 18, receiving application indicator 46, retrieving risk indicator 50 from database 52, and transmitting risk indicator 50 to the respective client system. Also, manager 62 may establish connections with application server 14, transmit application request 58, and receive target application 42 from server 14. Device emulator 64 may perform an emulation of a client system, such as a smartphone or a tablet computer, to create a virtual test device 112. In some embodiments, behavior manager 66 is configured to execute an instance of target application 42 on the virtual device, and to install an input agent 69 on the virtual device, input agent 69 configured to trigger a behavior of target application 42 as shown below. In some embodiments, network sniffer 68 may determine whether the target application performs a behavior deemed to pose a privacy risk to a user, as further shown below.

FIG. 7-B shows an alternative configuration to FIG. 7-A. In FIG. 7-B, a physical test device 212 is used in conjunction with security server 16. Examples of test devices 212 include a smartphone and a tablet computer, among others. Test device 112 may be similar in functionality to client systems 12*a*-*b* of FIG. 1. In the configuration of FIG. 7-B, security server 16 may comprise an application analyzer 160 connected to a communication manager 62. Application analyzer 160 may further include a behavior manager 166 and a traffic sniffer 168. Test device 212 executes an instance of OS 40, such as iOS® or Android®, among others, and further executes an input agent 169 on OS 40. In some embodiments, application analyzer 160 is connected to a communication device 230, such as a wireless modem, and uses device 230 for two-way communication with test device 212, including with input agent 169. In some embodiments, the operation of items 60, 62, 66, 68 and 69 may be similar to the operation of items 160, 162, 166, 168 and 169, respectively.

Figure 8:
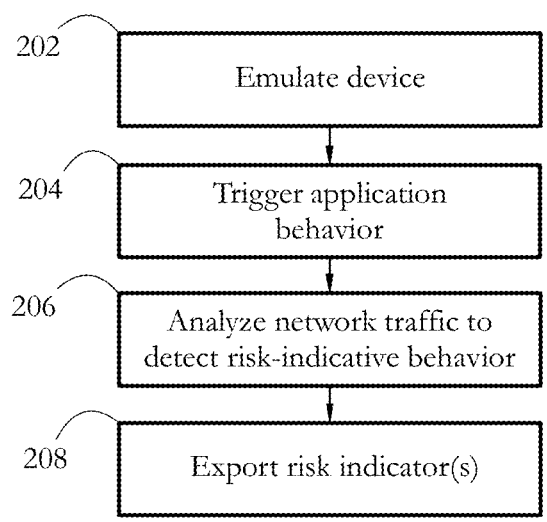
FIG. 8 shows an exemplary sequence of steps performed by the security server to identify a risk-indicative behavior of applications according to some embodiments of the present invention.

FIG. 8 illustrates an exemplary sequence of steps carried out by application analyzer 60 (FIG. 7-A), to identify risk-indicative behaviors of target application 42, according to some embodiments of the present invention. In a step 202, application analyzer 60 employs device emulator 64 to emulate a client system. In some embodiments, emulating the client system includes creating virtual device 112, comprising a software-generated environment that closely mimics and behaves like the actual hardware of the respective client system, and executing an instance of an operating system on virtual test device 112. Application analyzer 60 may execute the sequence illustrated in FIG. 8 repeatedly for a variety of devices (e.g., smartphones, tablets, personal computers) and/or a variety of OSs (e.g., Android®, Windows®).

Figure 9:
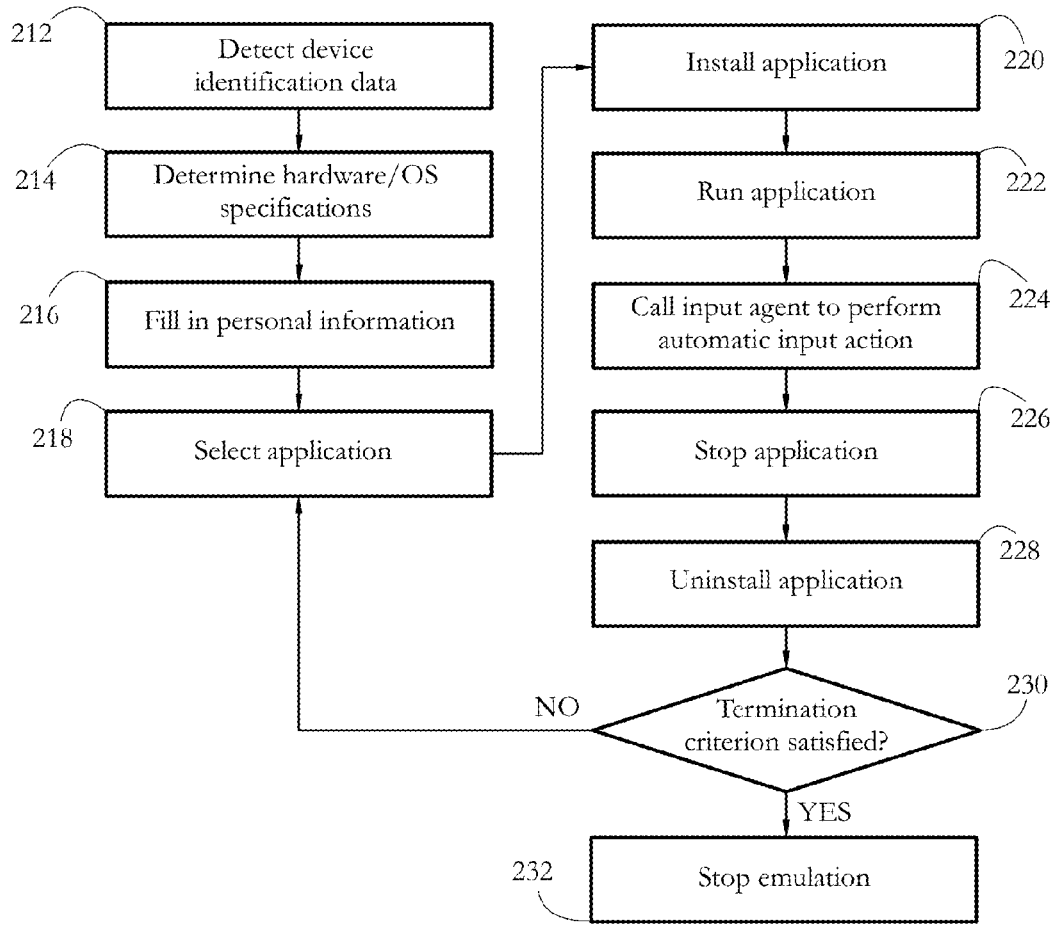
FIG. 9 illustrates an exemplary sequence of steps executed by the behavior manager in FIG. 7-A according to some embodiments of the present invention.

In a step 204, application analyzer 60 may invoke behavior manager 66 to trigger a behavior of target application 42. To trigger said behavior, manager 66 may employ input agent 69 executing on virtual test device 112. FIG. 9 illustrates an exemplary sequence of steps performed by behavior manager 66 in step 204 according to some embodiments of the present invention. In a step 212, manager 66 may detect a device identification indicator of the virtual device. Exemplary such indicators include an IMEI, an UDID, a serial number, and a make and/or model of the virtual device, among others. In a step 214, manager 66 may determine hardware and/or OS specifications of device 112, such as a type and version of the OS executing on virtual device 112. Next, in a step 216, manager 66 may personalize virtual test device 112, such personalization comprising, for example, configuring device 112 with personal information such as a name, a telephone number, a photograph, and an email address of a virtual user. Personalizing virtual test device 112 may further comprise filling an address book or contact list of device 112 with a set of virtual profiles, each such profile comprising for instance a name, a telephone number, and an email address. Data, such as names and addresses, used in personalizing device 112 may be predetermined and/or generated in a reproducible manner, so as to allow traffic sniffer 68 to determine whether an instance of the respective data is transmitted by application 42 to other parties over the network. In some embodiments, personalizing device 112 further comprises creating a set of functional resources, such as a working telephone number, email account, and/or a functional account for another service such as teleconferencing, instant messaging, and social networking, among others, and using configuration data of such functional resources (email address, telephone number, username, alias, etc.) to personalize device 112. The respective resources may then be monitored to further identify risk-indicative behaviors of application 42, for instance to detect whether application 42 is using a user's personal data to send unsolicited communication (spam).

A step 218 may select a target application for analysis. In some embodiments, application analyzer may process a plurality of target applications in batch mode; in such cases, a sequence of steps 220-228 may be executed in a loop, for each target application in turn. In step 220, manager 66 may receive target application 42, for instance by retrieving a copy of application 42 from application server 14 via communication manager 62 (see FIG. 4-B). Step 220 further comprises installing target application 42 on virtual test device 112. Next, in a step 222, behavior manager 66 may launch application 42 into execution.

In a step 224, behavior manager 66 may call on input agent 69 to perform an automatic input action, comprising generating a test input and supplying said test input to a data field used by target application 42. In some embodiments, step 224 may comprise launching input agent 69, and configuring agent 69 to execute for a predetermined time period.

In some embodiments, data fields targeted by input manager 69 comprise private data fields, configured to hold indicators of private items, the disclosure of which may create a privacy risk. Exemplary private items include a username, a password, an address book entry, and a geographical location, among others. To gain access to data fields used by application 42, input agent 69 may employ any method known in the art, for instance a method used in automatic software testing.

Figure 10:
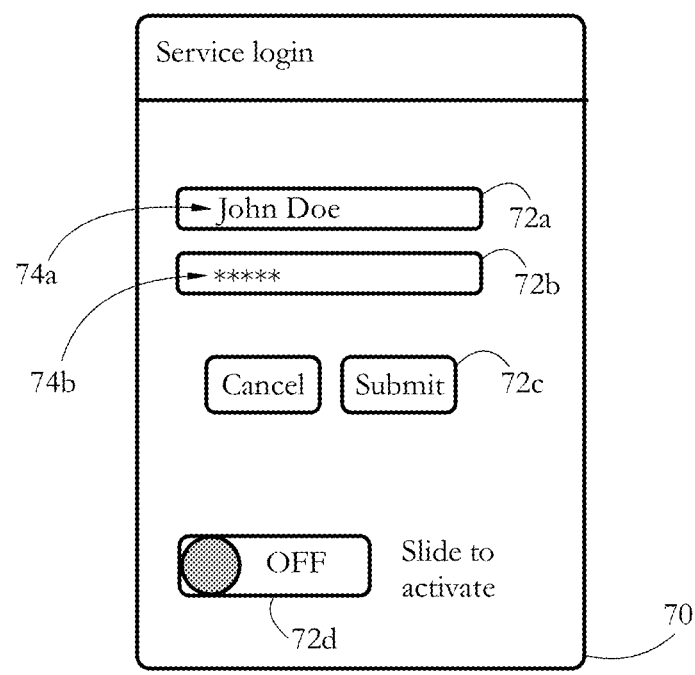
FIG. 10 shows an exemplary user interface exposed by a target application, the user interface comprising a plurality of input fields, according to some embodiments of the present invention.

Supplying the test input may include filling in an input field, such as a form field, exposed by target application 42. In an exemplary embodiment, agent 69 may intercept (e.g., hook) an application launch service of the operating system, such as the Springboard process of iOS®. Exemplary software performing such interception include the open-source Cycript package for iOS® (retrievable from www.cycript.org), and Robotium for Android®, from Jayway Ltd. In an iOS® embodiment, intercepting the Springboard process may give input agent 69 access to a set of user interfaces exposed by target application 42. Agent 69 may then parse each user interface view and determine whether the respective view contains any input fields. FIG. 10 illustrates an exemplary user interface 70 exposed by an application, the interface including a plurality of input fields 72a-d, such as a plain text field 72a, a hidden/password text field 72b, a button 72c, and a slider 72d.

For each input field, input agent 69 may determine whether the respective input field may trigger a behavior of the target application. In such determinations, agent 69 may use a set of predetermined rules; for instance, submit buttons, sliders, and text fields may be selected as possibly triggering a behavior of the target application. When an input field is selected, agent 69 may proceed to supply a test input to the respective field, for instance by filling in text fields, clicking on buttons, etc. For each text input field, such as a password field or an address book field, agent 69 may supply a test string comprising a sequence of characters to the respective field. Exemplary test strings are illustrated by items 74a-b in FIG. 10. In some embodiments, test strings are predetermined or generated by an automated generator in a reproducible manner (e.g., according to a predetermined set of keywords). For each filled-in text field, input agent 69 may register the respective test string for future reference, together with an indicator of an association between the respective input field and the respective test string. Registering test strings may allow application analyzer 60 to determine, for instance, whether an indicator of the respective test string is transmitted by target application 42 to another party on the network, as shown in more detail below.

In some embodiments, the actions performed by input agent 69 in step 224 (FIG. 9) may be performed repeatedly, for a plurality of views and/or input fields exposed by target application 42. Testing multiple combinations of inputs in this manner may increase the likelihood of determining target application 42 to trigger certain risk-indicative behaviors. In one such example, comprising a target application 42 that requires users to register before using the application, input agent 69 may attempt to determine application 42 to expose a registration view (for instance, by clicking various combinations of interface buttons). Such registration views commonly include username/password fields, allowing agent 69 to test a behavior of application 42 in handling such fields. When registration requires other actions on the part of the user, such as email activation comprising having the user click a link received in an email message to activate application 42, application analyzer 60 may be configured to carry out such registration procedures automatically (e.g., provide an email address, respond to an registration message, etc.). In some embodiments, application 42 may use for registration an email address taken from a user profile or an address book entry of virtual test device 112; in such cases application analyzer 60 may check an email account set up according to the user profile or address book entry to respond to the registration message.

In some embodiments, supplying the test input comprises determining whether target application 42 uses a data field configured to hold data provided by another application. In one such example, application 42 may access the test device's address book, to read data such as a name or telephone number of a person listed as a contact. In another example, application 42 may request a geolocation indicator from a sensor device (e.g., a GPS sensor) of the virtual device. In some embodiments, input agent 69 may intercept such a request, for instance by detecting an API call to perform the respective action (e.g., get the current GPS position, get a digital image from the camera, activate a BLUETOOTH® device, etc.). Input agent 69 may further generate the test input to match a data type and/or format of a data object (e.g., GPS location indicator) returned when executing the respective API call, and supply the test input, instead of the respective data object, to the requesting function call.

When input agent 69 exits, in a sequence of steps 226-228 (FIG. 9), behavior manager 66 may stop application 42 and then uninstall application 42 from virtual test device 112. Next, a step 230 may determine whether a termination criterion for emulation is satisfied. An exemplary termination criterion comprises determining whether the last application of a batch of target applications has been analyzed. When the termination criterion is satisfied, manager 66 may signal device emulator 64 to stop emulation in a step 232. When the termination criterion is not satisfied, execution returns to step 218, for instance to select another target application for analysis. In the example of FIG. 9, only one application may be installed and executed at one time (the sequence of steps 220-228 is completed for each application in turn). Such a configuration may be preferable over executing a plurality of applications concurrently, since it allows any behavior detected by application analyzer 60 to be attributed unequivocally to the target application currently executing.

Going back to FIG. 8, in a step 206, application analyzer 60 employs traffic sniffer 68 to analyze any communication generated between virtual test device 112 and a network (such as network 18 in FIG. 1), during execution of target application 42, to determine whether application 42 performs a risk-indicative behavior. For instance, traffic sniffer 68 may try to detect whether instances of a test string (e.g., a test password, some contact data), supplied by behavior manager 66 to target application 42, are being transmitted to other parties over the network. Such behavior may indicate a privacy risk associated to application 42.

In some embodiments, traffic sniffer 68 is connected to device emulator 64, and is configured to analyze an output of a virtual communication device set up by emulator 64. Such virtual communication devices may emulate physical communication devices, for instance a wireless modem or an Ethernet port, of a client system (see e.g., item 30 in FIG. 2-A). In some embodiments, analyzing an output of a virtual communication device comprises parsing a network log collected during execution of target application 42 (step 204 in FIG. 8). The respective network log may include a record of all incoming and/or outgoing communication between the virtual device executing application 42 and other entities on the network.

To detect instances of a test string being transmitted over the virtual communication device, traffic sniffer 68 may employ any method known in the art, for instance pattern matching algorithms applied to a network log. In some embodiments, traffic sniffer 68 attempts to match not only the test string, but also a set of hashes of the respective test string, determined using various hash functions such as message digest (e.g., MD5) and secure hash (SHA) algorithms. In so doing, traffic sniffer 68 may detect whether a test string, such as a password, is being sent in plain text form or in encrypted form, and may also estimate a strength of the encryption algorithm employed to encrypt the respective test string. In one such example, wherein application 42 transmits data via a HTTP request, wherein test string "john47" was supplied to an input field called "usr" and test string "password47" was supplied to an input field called "pass", and assuming a hash of "password47" is "bf53a56d", the respective HTTP request may include exemplary strings "usr=john47&pass=password47", or "usr=john47&pass=bf53a56d". Traffic sniffer 68 may try to match the strings "john47", "password47", and "bf53a56d", among others, within the respective HTTP request.

When performing pattern matching of hashes, as described above, test strings may be hashed individually, or in combination with other test strings. For instance, to determine whether contents of an address book are being transmitted to another party, traffic sniffer 68 may hash a content of each field individually (e.g., each first name, each last name, each telephone number separately), a content of each profile individually (e.g., first name+last name+telephone number for each listed person), and a content of the entire address book, among others.

In some embodiments, application 42 may use an encrypted communication channel, for instance a protocol such as transport layer security (TLS) or HTTPS, to communicate with other parties on the network. In such situations, traffic sniffer 68 may employ any method known in the art, for instance a man-in-the-middle method, to decrypt the respective communication prior to performing string matching.

In some embodiments, in a step 208 (FIG. 8), application analyzer 60 may construct risk indicator 50 of application 42, and may transmit indicator 50 to behavior database 52. Some embodiments of analyzer 60 may incorporate into indicator 50 a set of device-identification and/or OS identification data, such as data determined in steps 212-214 (FIG. 9), thus associating a set of behaviors with a type of device and/or with a type of operating system.

Although the above description related to FIGS. 8-9-10 applies to the exemplary configuration of security server 16 illustrated in FIG. 7-A, a person skilled in the art will appreciate that methods described above may be adapted with minimal modification to apply to the alternative configuration shown in FIG. 7-B. Such modification may comprise, for instance, executing target application 42 on physical test device 212, instead of virtual test device 112. Also, actions performed by application analyzer 60 related to device emulation may no longer be needed.

FIG. 11-A shows an exemplary sequence of steps performed by security application 44 executing on client system 12 (e.g., FIG. 3), according to some embodiments of the present invention. In a step 242, application 44 detects a target application 42 installed on client system 12. To detect that an application is installed, security application 44 may use static and/or dynamic methods. In some embodiments, static methods comprise methods of identifying an application without actually executing the respective application. Several static methods are known in the art. For instance, application 44 may identify target application 42 according to a name of a package file, according to a location of a resource (such as a file) of the respective application, and/or according to an image used as a screen icon by the respective application. In another exemplary static method, security application 44 may identify target application 42 according to a set of URI schemes used by application 42. In some embodiments, a combination of static methods may be used, for instance by combining a set of identification scores, each score determined according to a distinct static method. Alternatively, security application 44 may employ a decision tree, progressively pruning a set of candidate applications by successive use of static methods. In some embodiments, dynamic methods include identifying target application 42 according to a behavior or an output of the respective application. Another exemplary dynamic method comprises determining a set of processes launched by the respective application, and matching a list of applications against a list of processes to identify candidate applications.

In a step 244, security application 44 computes application indicator 46 of target application 42 and transmits indicator 46 to security server 16. In a step 246, security application 44 may receive risk indicator 50 from security server 16. Exemplary indicators 46 and 50 were described above, in relation to FIGS. 4-A, 5, and 6. Next, in a step 248, security application 44 may display to the user an indicator of a behavior and/or an indicator of a risk associated with installation and/or execution of target application 42. To execute step 248, security application 44 may maintain a local repository of behavior entries and selectively retrieve a set of behaviors indicated by risk indicator 50 from the local repository. Such a local repository may be kept up to date by periodic or on-demand software updates from security server 16 or from behavior database 52. Alternatively, security application 44 may selectively retrieve the set of behavior entries remotely from database 52.

FIG. 11-B illustrates an exemplary sequence of steps performed by an alternative embodiment of security application 44. In contrast to FIG. 11-A, in a step 252, instead of automatically detecting installed applications, security application 44 may select target application 42 according to an input from a user. FIG. 11-B may represent for instance a scenario, in which the user may be interested in evaluating target application 42 before deciding whether to download and/or install the respective application. In an exemplary embodiment, security application 44 may execute as a server-side script, and may be accessed by client system 12 via a webpage allowing the user to select an application by e.g., clicking an icon. In an alternative embodiment, application 44 may function as a client-side script or a plugin for a web browser. Security application 44 may maintain a list of candidate applications evaluated for risk-indicative behavior, and may display the respective list to the user. Application 44 may further receive user input indicative of a choice of target application. In a step 254, application 44 may formulate application indicator 46 and send indicator 46 to security server 16. To perform step 254, some embodiments may maintain a set of predetermined application indicators, each predetermined for an application of the list of candidate applications, and may selectively retrieve indicator 46 according to the user's selection. Steps 256-258 may proceed in a manner similar to that of steps 246-248, respectively.

The exemplary systems and methods described above allow a client device, such as a smartphone or a tablet computer, to protect the privacy of a user of the respective device, including to protect the user from online fraud. In some embodiments, the client device sends an indicator of a target application to a security server. For example, the target application may be installed on the client system. In response, the client device receives from the security server a risk indicator indicative of whether installing and/or executing the target application causes a security risk. In some embodiments, the risk indicator comprises an indicator of a behavior of the target application, the behavior itself indicative of the respective security risk. Exemplary risk-indicative behaviors of the target application include sending personal data, such as address book entries and passwords, over the network. The client device may display a list and/or a description of such risk-indicative behaviors to the user.

In some embodiments, determining the risk indicator occurs at the security server and includes installing and executing an instance of the target application on a test device (physical or emulated), automatically detecting an input field exposed by the target application, for instance an address book field or a password field exposed within a user interface, and supplying a test string to the respective input field. Next, the security server determines whether the test device transmits an indicator of the test string, such as the test string itself or a hash of the test string, to another party on the network. When such transmissions are detected, security server may determine that executing the target application may cause the security risk.

In some embodiments, determining the risk indicator comprises supplying a test input to the target application, the test input being of other kind than a user input. For instance, the target application may request input from another application (e.g., requesting a geolocation indicator from a GPS sensor), or may access various device and/or OS configuration data (e.g., a device identification indicator, or an address book entry). In such cases, supplying the test input may comprise intercepting a function call of the target application, and supplying the test input to mimic a result of executing the respective function call. The security server may then determine whether an indicator of the test input is transmitted over the network.

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising at least one hardware processor configured to determine a risk indicator indicative of whether executing a target application on a mobile computing device causes a privacy risk to a user of the mobile computing device, wherein determining the risk indicator comprises:
  supplying a test input to an instance of the target application executing on a test device, the test input supplied to a data field configured to hold an indicator of a private item, wherein a disclosure of the private item causes the privacy risk;
  in response to supplying the test input, analyzing a communication between the test device and a network to identify a test output produced by the test device;
  performing a comparison between the test input and the test output to determine whether the test output comprises an output item selected from a group consisting of the test input and of a hash determined according to the test input; and
  in response, when the test output comprises the output item, determining that executing the target application causes the privacy risk.

2. The computer system of claim 1, wherein supplying the test input comprises filling in an input field of a user interface exposed by the test device.

3. The computer system of claim 2, wherein supplying the test input further comprises:
  configuring the instance of the target application to expose the user interface, and in response, automatically detecting the input field within the user interface, and wherein filling in the input field is performed in response to automatically detecting the input field.

4. The computer system of claim 1, wherein supplying the test input comprises:
  supplying the test input to a second application executing on the test device, the second application configured to personalize the test device according to the test input, and in response to supplying the test input to the second application, transmitting the test input from the second application to the instance of the target application.

5. The computer system of claim 1, wherein supplying the test input comprises:
   detecting a request by the instance of the target application to receive a content of the data field from a second application executing on the test device, and
   in response to detecting the request, replacing the content with the test input.

6. The computer system of claim 1, wherein the risk indicator comprises an indicator of a risk-indicative behavior of the target application.

7. The computer system of claim 1, wherein the private item comprises an item selected from another group consisting of a personal name, a password, an authentication name, a telephone number, an email address, a uniform resource indicator (URI), a digital image, a digital sound, and a geographical location.

8. The computer system of claim 1, wherein the output item comprises the test input.

9. The computer system of claim 1, wherein the output item comprises the hash.

10. The computer system of claim 1, wherein the hash consists of the test input in hashed form.

11. A mobile device comprising at least one hardware processor configured to perform risk assessment transactions with a security server, wherein a risk assessment transaction comprises:
   employing the at least one hardware processor to send an indicator of a target application to the security server; and
   in response to sending the indicator of the target application, employing the at least one hardware processor to receive from the security server a risk indicator determined for the target application, the risk indicator indicative of whether executing the target application causes a privacy risk, and wherein determining the risk indicator comprises:
   supplying a test input to an instance of the target application executing on a test device, the test input supplied to a data field configured to hold an indicator of a private item, wherein a disclosure of the private item causes the privacy risk;
   in response to supplying the test input, analyzing a communication between the test device and a network to identify a test output produced by the test device;
   performing a comparison between the test input and the test output to determine whether the test output comprises an output item selected from a group consisting of the test input and of a hash determined according to the test input; and
   in response, when the test output comprises the output item, determining that executing the target application causes the privacy risk.

12. The mobile device of claim 11, wherein supplying the test input comprises filling in an input field of a user interface exposed by the test device.

13. The mobile device of claim 12, wherein supplying the test input further comprises:
   configuring the instance of the target application to expose the user interface, and in response, automatically detecting the input field within the user interface, and wherein filling in the input field is performed in response to automatically detecting the input field.

14. The mobile device of claim 11, wherein supplying the test input comprises:

supplying the test input to a second application executing on the test device, the second application configured to personalize the test device according to the test input, and
   in response to supplying the test input to the second application, transmitting the test input from the second application to the instance of the target application.

15. The mobile device of claim 11, wherein supplying the test input comprises:
   detecting a request by the instance of the target application to receive a content of the data field from a second application executing on the test device, and
   in response to detecting the request, replacing the content with the test input.

16. The mobile device of claim 11, wherein the risk indicator comprises an indicator of a risk-indicative behavior of the target application.

17. The mobile device of claim 16, wherein the at least one hardware processor is further configured to display a description of the risk-indicative behavior in response to receiving the risk indicator.

18. The mobile device of claim 11, wherein the target application is installed on the mobile device.

19. The mobile device of claim 11, wherein the private item comprises an item selected from another group consisting of a personal name, a password, an authentication name, a telephone number, an email address, a uniform resource indicator (URI), a digital image, a digital sound, and a geographical location.

20. The mobile device of claim 11, wherein the output item comprises the test input.

21. The mobile device of claim 11, wherein the output item comprises the hash.

22. The mobile device of claim 11, wherein the hash consists of the test input in hashed form.

23. A method comprising employing at least one hardware processor of a computer system to determine a risk indicator indicative of whether executing a target application on a mobile computing device causes a privacy risk to a user of the mobile computing device, wherein determining the risk indicator comprises:
   supplying a test input to an instance of the target application executing on a test device, the test input supplied to a data field configured to hold an indicator of a private item, wherein a disclosure of the private item causes the privacy risk;
   in response to supplying the test input, analyzing a communication between the test device and a network to identify a test output produced by the test device;
   performing a comparison between the test input and the test output to determine whether the test output comprises an output item selected from a group consisting of the test input and of a hash determined according to the test input; and
   in response, when the test output comprises the output item, determining that executing the target application causes the privacy risk.

24. A non-transitory computer-readable medium storing instructions which, when executed by at least one hardware processor of a computer system, cause the computer system to determine a risk indicator indicative of whether executing a target application on a mobile computing device causes a privacy risk to a user of the mobile computing device, wherein determining the risk indicator comprises:
   supplying a test input to an instance of the target application executing on a test device, the test input supplied to a data field configured to hold an indicator of a private item, wherein a disclosure of the private item causes the privacy risk;

in response to supplying the test input, analyzing a communication between the test device and a network to identify a test output produced by the test device;

performing a comparison between the test input and the test output to determine whether the test output comprises an output item selected from a group consisting of the test input and of a hash determined according to the test input; and in response, when the test output comprises the output item, determining that executing the target application causes the privacy risk.

* * * * *